United States Patent
Uchikawa (10) Patent No.: US 10,212,131 B2
(45) Date of Patent: Feb. 19, 2019

(54) NETWORK DEVICE THAT REGISTERS EVENT, METHOD OF CONTROLLING THE SAME, AND STORAGE MEDIUM

(71) Applicant: CANON KABUSHIKI KAISHA, Tokyo (JP)

(72) Inventor: Shinichi Uchikawa, Matsudo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/602,281

(22) Filed: May 23, 2017

(65) Prior Publication Data
US 2017/0353432 A1  Dec. 7, 2017

(30) Foreign Application Priority Data
Jun. 3, 2016  (JP) .................................. 2016-111698

(51) Int. Cl.
| | | |
|---|---|---|
| H04L 29/06 | (2006.01) | |
| G06F 21/60 | (2013.01) | |
| G06F 3/12 | (2006.01) | |
| H04N 1/00 | (2006.01) | |
| H04N 1/44 | (2006.01) | |
| G06F 21/55 | (2013.01) | |

(52) U.S. Cl.
CPC ........ *H04L 63/0236* (2013.01); *G06F 3/1222* (2013.01); *G06F 3/1238* (2013.01); *G06F 3/1286* (2013.01); *G06F 21/552* (2013.01); *G06F 21/608* (2013.01); *H04N 1/00408* (2013.01); *H04N 1/4433* (2013.01); *G06F 2221/2135* (2013.01)

(58) Field of Classification Search
CPC combination set(s) only.
See application file for complete search history.

(56) References Cited

U.S. PATENT DOCUMENTS

| | | | | |
|---|---|---|---|---|
| 2014/0074977 | A1* | 3/2014 | Niida | H04N 21/234345 709/217 |
| 2015/0052576 | A1* | 2/2015 | Togawa | H04L 63/0227 726/1 |
| 2017/0201545 | A1* | 7/2017 | Nicodemus | H04L 63/1433 |
| 2017/0223011 | A1* | 8/2017 | Schultz | H04L 63/0815 |
| 2017/0339566 | A1* | 11/2017 | Yasuda | H04W 12/08 |

FOREIGN PATENT DOCUMENTS

JP  2007257481 A  10/2007

OTHER PUBLICATIONS

Office Action issued in U.S. Appl. No. 15/407,752 dated Nov. 30, 2018.

* cited by examiner

*Primary Examiner* — Helen Zong (74) *Attorney, Agent, or Firm* — Rossi, Kimms & McDowell LLP

(57) ABSTRACT

A network device that avoids useless processing for registering an event which cannot be transmitted. An image forming apparatus as a network device has a personal firewall function, and registers an event concerning a network service. Upon receipt of an event registration request, it is determined whether or not a transmission destination specified by the received event registration request corresponds to a transmission restriction target of the personal firewall, and when it is determined that the transmission destination corresponds to the transmission restriction target, an event based on the registration request is not registered.

9 Claims, 6 Drawing Sheets

An event registration request has occurred which specifies a communication destination (Port No. 5000) to which transmission is inhibited by the personal firewall.

Would you add the communication destination as a destination excluded from the restriction targets of the personal firewall?

| NO | YES |

NETWORK DEVICE THAT REGISTERS EVENT, METHOD OF CONTROLLING THE SAME, AND STORAGE MEDIUM

BACKGROUND OF THE INVENTION

Field of the Invention

The present invention relates to a technique for registering an event associated with a network service.

Description of the Related Art

Conventionally, there has been known a technique for asynchronously receiving an event generated at a terminal in a network (e.g. WS-Eventing (Web Services Eventing)). In this technique, contents of an event desired to receive and a transmission destination of the event (URL of an event reception address) are registered in an event transmission source. With this registration, when an event generated in the event transmission source is detected, the generated event is notified to the registered event transmission destination.

In Japanese Laid-Open Patent Publication (Kokai) No. 2007-257481, there has been proposed a technique in which if an event transmission source fails in communication with an event transmission destination, a printing device counts the number of failures, and when the number of failures reaches a predetermined number, the printing device deletes the event transmission destination from the registration. Further, there is another technique proposed as a system equipped with a personal firewall function of restricting network communication made from outside to a computer of the system, in order to prevent the system from being remotely attacked via a network. Note that the personal firewall function includes a type which does not uniformly restrict communication from remote devices, but allows a setting of permitting communication to a specific IP address or a specific port number.

There is a system in which a terminal in a network, such as an information processing apparatus, operates as an event registration requesting source, and an image forming apparatus as a network device operates as an event transmission source. In this system, in response to a registration request from the information processing apparatus, the image forming apparatus performs event registration processing to register an event condition, a transmission destination of an event (event transmission destination), and so forth. However, in a case where the image forming apparatus is equipped with the personal firewall function, even when the image forming apparatus attempts to notify an event to the event transmission destination, there is a possibility that the transmission is blocked, depending on the settings of the personal firewall. For example, in a case where the port number of the event transmission destination is set to a transmission restriction target of the personal firewall, even when the image forming apparatus attempts to send an event notification, the event notification transmission is discarded by the transmission restriction function of the personal firewall of the image forming apparatus. As a result, the information processing apparatus cannot receive the event generated in the image forming apparatus.

Here, the event transmission destination (URL) has been registered in the image forming apparatus according to a request from the information processing apparatus, and the event registration has been successfully performed. Therefore, the information processing apparatus is in a state expecting that the event is to be notified from the image forming apparatus. That is, in the information processing apparatus, it is impossible to know that the event notification for notifying the event generated in the image forming apparatus has been discarded by the personal firewall of the image forming apparatus, and hence the information processing apparatus continues to wait for the event notification which will never be transmitted. If such an event transmission destination is registered, this results in useless event registration.

SUMMARY OF THE INVENTION

The present invention provides a network device that avoids useless processing for registering an event which cannot be transmitted, a method of controlling the same, and a storage medium.

In a first aspect of the invention, there is provided a network device that has a personal firewall function, and registers an event concerning a network service, comprising a reception unit configured to receive a registration request for registering an event, a determination unit configured to determine whether or not a transmission destination specified by the registration request received by the reception unit corresponds to a transmission restriction target of the personal firewall, and a control unit configured to perform control, when it is determined by the determination unit that the transmission destination corresponds to the transmission restriction target, so as not to register an event according to the registration request.

In a second aspect of the invention, there is provided a method of controlling a network device that has a personal firewall function, and registers an event concerning a network service, comprising receiving a registration request for registering an event, determining whether or not a transmission destination specified by the registration request received by said receiving corresponds to a transmission restriction target of the personal firewall, and performing control, when it is determined by said determining that the transmission destination corresponds to the transmission restriction target, so as not to register an event according to the registration request.

In a third aspect of the invention, there is provided a non-transitory computer-readable storage medium storing a computer-executable program for executing a method of controlling a network device that has a personal firewall function, and registers an event concerning a network service, wherein the method comprises receiving a registration request for registering an event, determining whether or not a transmission destination specified by the registration request received by said receiving corresponds to a transmission restriction target of the personal firewall, and performing control, when it is determined by said determining that the transmission destination corresponds to the transmission restriction target, so as not to register an event according to the registration request.

According to the present invention, it is possible to avoid useless processing for registering an event which cannot be transmitted.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof. Note that the present invention is not limited to the embodiments described below, and not all combinations of features described in the embodiments are absolutely essential to the invention.

Figure 1:
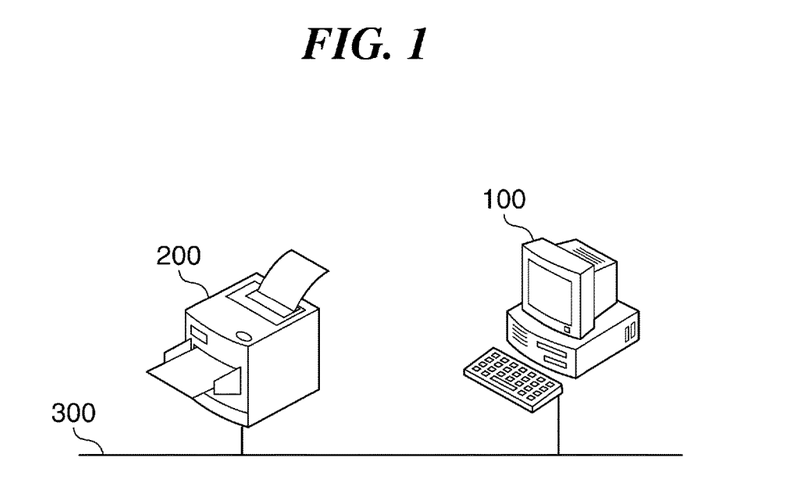
FIG. 1 is a diagram of an event registration system.

FIG. 1 is a diagram of an event registration system including a network device according to an embodiment of the present invention. This system is comprised of an information processing apparatus 100 and an image forming apparatus 200 as a network device, which are connected via a network 300 in a manner communicable with each other. The number of information processing apparatuses 100 is not particularly limited.

Figure 2:
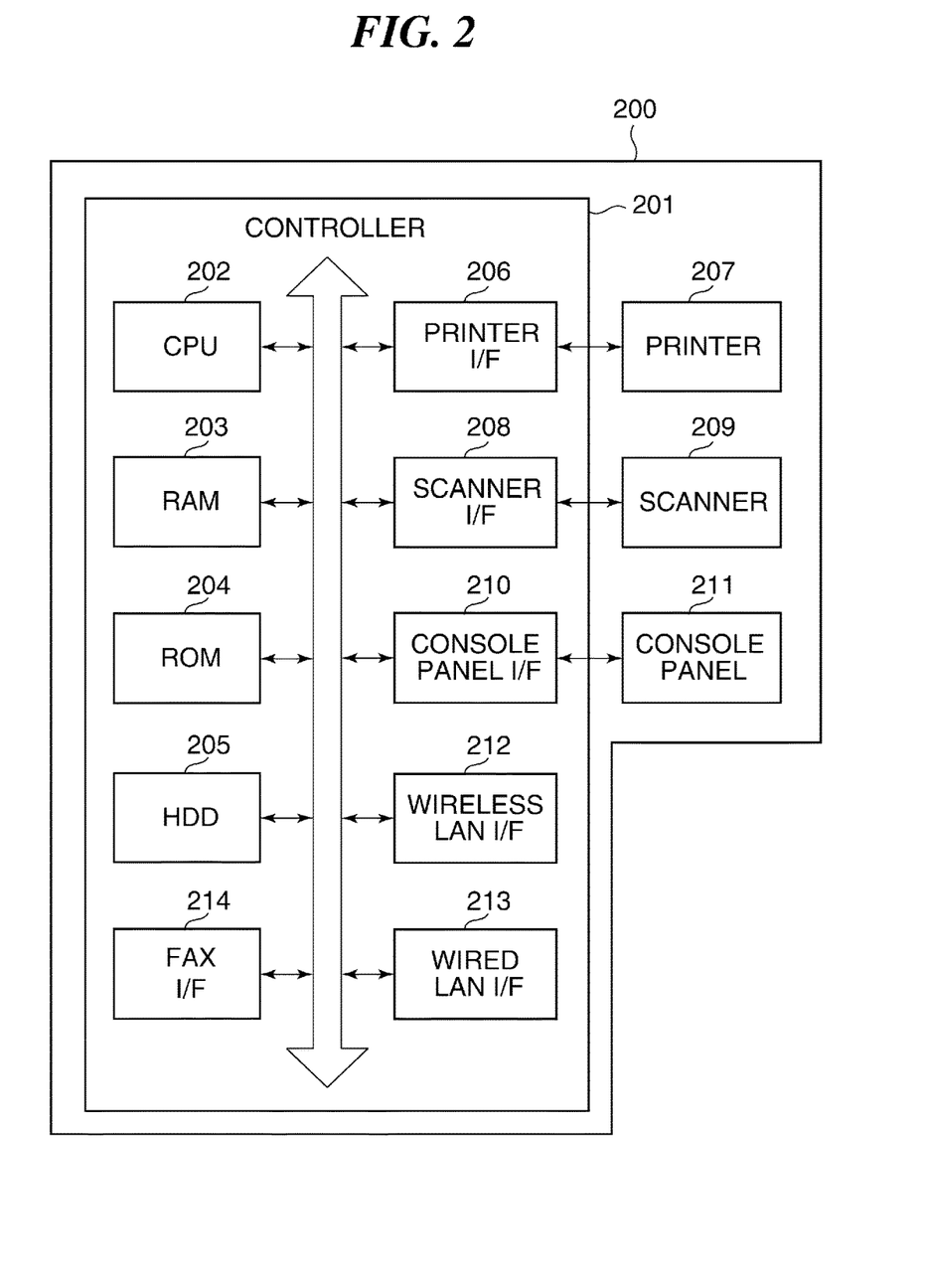
FIG. 2 is a block diagram showing the hardware configuration of an image forming apparatus.

FIG. 2 is a block diagram showing the hardware configuration of the image forming apparatus 200. A controller 201 includes a CPU 202. The controller 201 controls the overall operation of the image forming apparatus 200. The CPU 202 performs various types of control, such as communication control, by reading out control programs stored in a ROM 204. A RAM 203 is used as a main memory and a temporary area, such as a work area, for the CPU 202. An HDD 205 stores data and various programs, and various information tables. Image data is also stored in the HDD 205.

A printer interface 206 connects between a printer 207 as a printer engine and the controller 201. The printer 207 performs print processing on sheets fed from a sheet feed cassette, not shown, based on print data input via the printer interface 206. A scanner interface 208 connects between a scanner 209 and the controller 201. The scanner 209 reads an original set thereon, and generates image data based on a result of the reading. The image data generated by the scanner 209 is printed by the printer 207, stored in the HDD 205, or transmitted to an external apparatus via a FAX interface 214, a wireless LAN interface 212, or a wired LAN interface 213. As described above, the image forming apparatus 200 has an image forming function and an image transmission function.

A console panel interface 210 connects between a console panel 211 and the controller 201. The wireless LAN interface 212 performs wireless communication with an external apparatus, such as a mobile terminal and a PC (personal computer). The image forming apparatus 200 receives print data from an external apparatus via this wireless communication, and the printer 207 performs print processing based on the received print data. The wired LAN interface 213 is capable of performing communication with an external apparatus by connecting a LAN cable thereto. The FAX interface 214 is capable of connecting to a telephone line network by analog communication or ISDN communication using a telephone line cable connected thereto. Note that although the image forming apparatus 200 has a configuration in which one CPU 202 performs an event registration process in FIG. 5 and the like, described hereinafter, using one memory (RAM 203), any other configuration may be employed. For example, the image forming apparatus 200 may perform each process by causing a plurality of CPUs and a plurality of memories to operate in cooperation.

Figure 3:
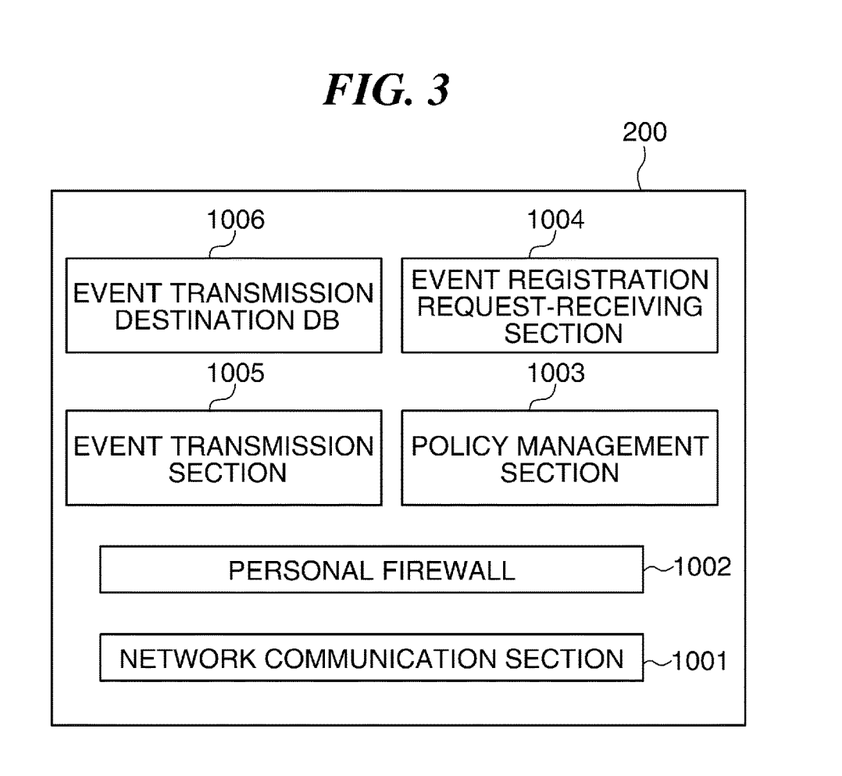
FIG. 3 is a block diagram showing the software configuration of the image forming apparatus.

FIG. 3 is a block diagram showing the software configuration of the image forming apparatus 200. The respective functions shown in FIG. 3 are realized by the CPU 202 that executes the control programs stored in the ROM 204 and the HDD 205. A network communication section 1001 controls wireless communication performed by the wireless LAN interface 212, and controls communication performed by the wired LAN interface 213. A personal firewall 1002 is a function of restricting communication of the network communication section 1001 via the network 300, and has two types of settings: settings of restrictions on transmission and settings of restrictions on reception. A policy management section 1003 manages a personal firewall policy. The personal firewall 1002 is capable of releasing restrictions on communication satisfying specific conditions according to settings stored in the policy management section 1003.

Figure 4:
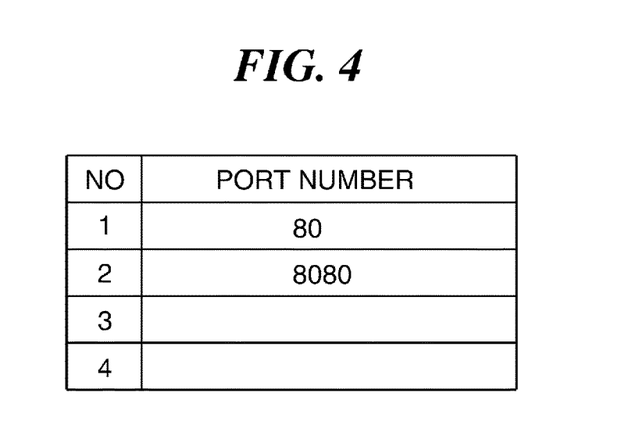
FIG. 4 is a diagram showing an example of permission conditions in transmission settings.

The policy management section 1003 is capable of setting the enabling/disabling of the function of the personal firewall 1002 according to a user's instruction. The policy management section 1003 has a function of managing restrictions on communication of the personal firewall 1002, as mentioned above. One of the restrictions on the communication include description of permission conditions in transmission settings. For example, as shown in FIG. 4, a permission condition is information defining a permission target to which transmission is permitted. The information defines whether or not to permit transmission with respect to a port number with which the information processing apparatus 100 communicates. The setting of enabling/disabling the function of the personal firewall 1002 and the permission conditions shown in FIG. 4 are managed by the policy management section 1003.

In the illustrated example in FIG. 4, even when the transmission restriction function of the personal firewall 102 is enabled, an item No. 1 indicates that the communication is permitted if the communication is performed with respect to a port number 80. An item No. 2 indicates that the communication is permitted if the communication is performed with respect to a port number 8080. Therefore, even when the personal firewall function is enabled, if the event transmission destination corresponds to a permission target, the event can be transmitted.

An event registration request-receiving section 1004 is a reception unit that receives an event registration request for requesting registration of at least one or more available network services provided by the image forming apparatus 200 e.g. from the information processing apparatus 100 via the network 300. The event registration request-receiving section 1004 is hereinafter sometimes simply referred to as the "request reception section 1004". Upon receipt of an event registration request, the CPU 202 performs an event registration process. More specifically, the CPU 202 registers an event condition specified by the received event registration request and an event transmission destination URL which is a transmission destination of an event, in an event transmission destination DB 1006. If an event satisfying the event condition registered in the event transmission destination DB is generated, an event transmission section 1005 transmits the generated event to an event transmission destination URL associated therewith. For example, in a case where the registered event is "printer status notification", if there occurs an error in the image forming apparatus 200, in which sheets to be output run out, the image forming apparatus 200 notifies the event transmission destination URL of "paper-out information" as an event. This enables the apparatus as the event transmission destination to know that the image forming apparatus 200 is in a "paper-out" state.

Figure 5:
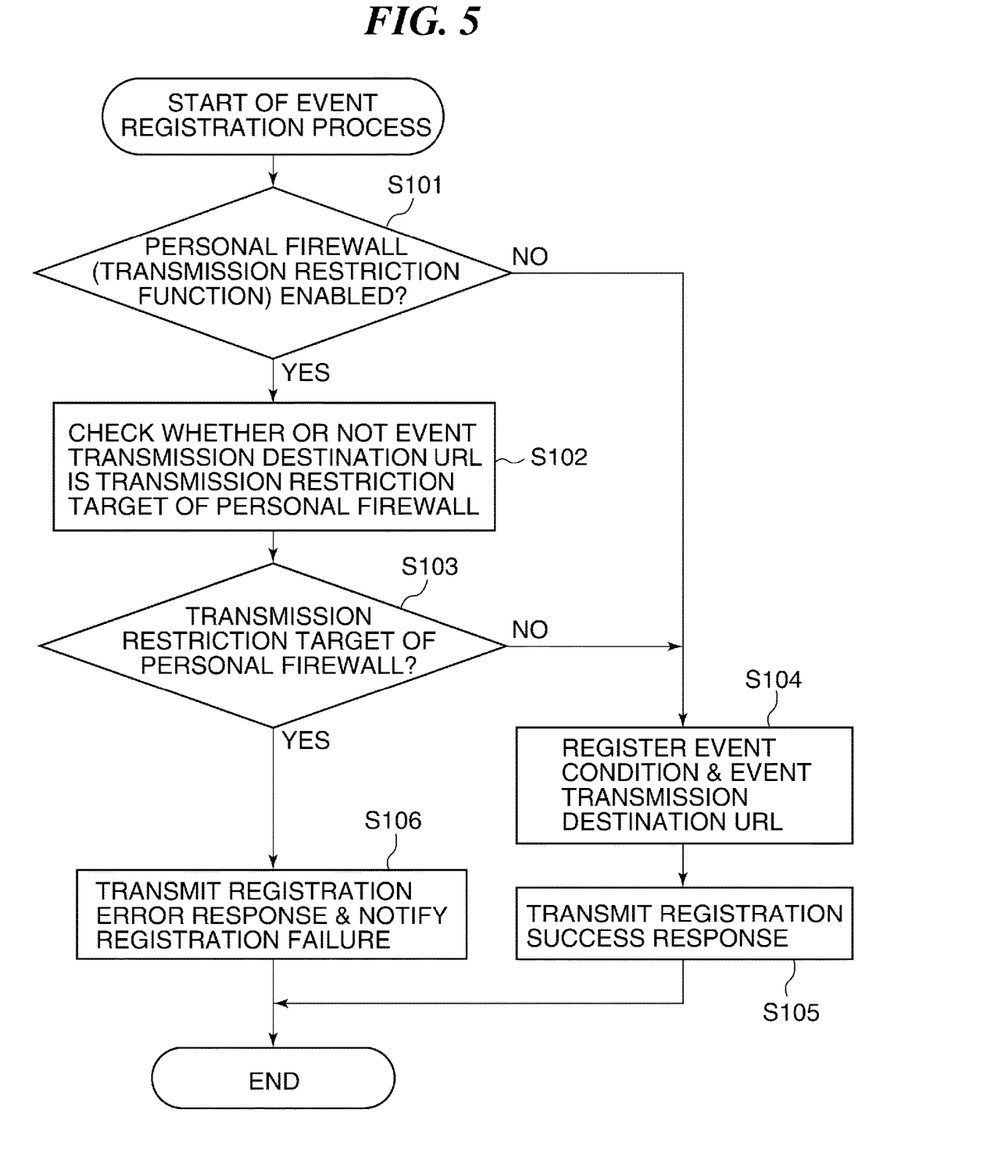
FIG. 5 is a flowchart of an event registration process.

FIG. 5 is a flowchart of the event registration process. A program for executing the event registration process is stored in the ROM 204 or the HDD 205, and is executed by the CPU 202 after being loaded into the RAM 203. The event registration process in FIG. 5 is started when the request reception section 1004 receives an event registration request. In the event registration process, the CPU 202 functions as a determination unit and a control unit of the present invention.

First, the CPU 202 determines whether or not the transmission restriction function of the personal firewall is enabled (step S101). In a case where it is determined in the step S101 that the transmission restriction function of the personal firewall is disabled, event transmission can be enabled by executing event registration. In this case, the CPU 202 determines that an event transmission destination URL specified by the event registration request received this time is not a transmission restriction target, and executes event registration processing according to the received event registration request (step S104). More specifically, the CPU 202 registers an event condition and the event transmission destination URL, which are specified by the event registration request, in association with each other, in the event transmission destination DB 1006. Then, the CPU 202 transmits a registration success response to the transmission source of the event registration request received this time (step S105), followed by terminating the present process.

On the other hand, in a case where it is determined in the step S101 that the transmission restriction function of the personal firewall is enabled, event transmission cannot be enabled only by executing event registration. Therefore, the CPU 202 proceeds to a step S102, wherein the CPU 202 checks whether or not the event transmission destination URL specified by the event registration request is a transmission restriction target of the personal firewall (not included in the permission targets). More specifically, the CPU 202 acquires a host name (IP address) and a port number from the event transmission destination URL, and checks whether or not these information items are included in the transmission permission targets of the personal firewall, to thereby check whether or not the event transmission destination URL is a transmission restriction target. The processing performed in the steps S101 and S102 for checking whether or not the event transmission destination URL corresponds to a "transmission restriction target" to which transmission is inhibited by the personal firewall will be described using an example of the event transmission destination URL.

Let us consider, by way of example, a case where the event transmission destination URL is "http://172.24.10.10:5000/wsd/event". In this case, a remote IP address is "172.24.10.10", and a port number is "5000". The CPU 202 refers to the permission conditions (see FIG. 4) registered in the policy management section 1003, and checks whether or not the port number corresponds to a permission target. In the illustrated example in FIG. 4, the port number 5000 is not included in the permission targets indicated by the permission conditions shown in FIG. 4, and hence transmission is not allowed by the personal firewall. Therefore, it is determined that this event transmission destination URL is a transmission restriction target.

Further, let us consider, by way of example, a case where the event transmission destination URL is "http://172.24.10.10:80/wsd/event", the remote IP address is "172.24.10.10", and the port number is "80". In this case, in the illustrated example in FIG. 4, the port number 80 is included in the permission targets indicated by the permission conditions shown in FIG. 4, and hence transmission is permitted by the personal firewall. Therefore, it is determined that this event transmission destination URL is not a transmission restriction target.

Next, in a step S103, the CPU 202 determines whether or not the event transmission destination URL is a transmission restriction target of the personal firewall, based on a result of the check in the step S102.

More specifically, it is determined in the step S103 whether or not the event transmission destination URL specified by the event registration request received this time corresponds to a transmission restriction target to which transmission is inhibited by the personal firewall. This determination is performed based on the setting of enabling/disabling of the personal firewall and whether or not the event transmission destination URL is included in the permission targets. More specifically, in a case where the transmission restriction function of the personal firewall is enabled, and also the event transmission destination URL does not correspond to any permission target, it is determined that the event transmission destination URL corresponds to a transmission restriction target. Further, even when the transmission restriction function is set enabled, if the event transmission destination URL corresponds to a permission target, it is determined that the event transmission destination URL does not correspond to a transmission restriction target. Note that in a case where the transmission restriction function is set disabled, it is also judged that the event transmission destination URL does not correspond to a transmission restriction target.

Next, in a case where it is determined in the step S103 that the event transmission destination URL is not a transmission restriction target of the personal firewall (the event transmission destination URL is a permission target), event transmission is enabled by performing event registration, so that the CPU 202 proceeds to the step S104. On the other hand, in a case where it is determined in the step S103 that the transmission destination URL is a transmission restriction target (the transmission destination URL is not a permission target) of the personal firewall, even if event registration is performed, an event to be transmitted is blocked and discarded by the personal firewall, so that the CPU 202 proceeds to a step S106.

Figure 6:
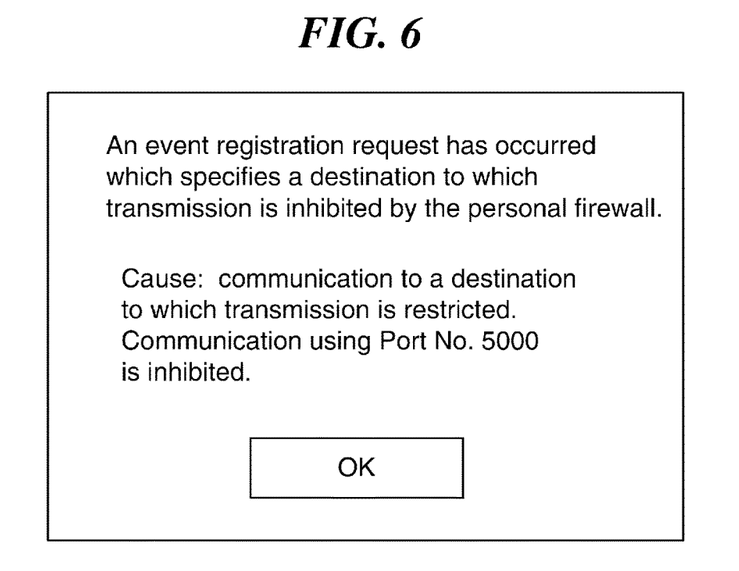
FIG. 6 is a diagram showing an example of display of an error screen.

In the step S106, the CPU 202 transmits a registration error response to the transmission source (information processing apparatus 100) of the event registration request received this time, and also notifies an administrator of the image forming apparatus 200 of the failure. Therefore, the CPU 202 causes event registration to fail, and hence the event condition and the event transmission destination URL based on the event registration request are not registered. In the notification processing in the step S106, to notify the administrator of the image forming apparatus 200 of the registration failure, the CPU 202 displays such an error screen as shown in FIG. 6 on the console panel 211. This display includes information indicative of a cause of the event registration failure. Note that the notification processing may be performed by using sound, etc. Further, when transmitting the registration error response, it is also possible to notify the information processing apparatus 100 of details of a cause of the failure by transmitting the response including the details of the cause of the registration failure. For example, the response may include not only the fact of the failure of event registration but also the fact that the failure is caused by the setting of the personal firewall. Note that the transmission destination of the register error response may include the event transmission destination URL. After execution of the step S106, the event registration process in FIG. 5 is terminated.

According to the present invention, in a case where a transmission destination (event transmission destination URL) specified by a received event registration request corresponds to a transmission restriction target of the personal firewall, event registration is not performed. This makes it possible to avoid useless processing for registering an event which cannot be transmitted, when performing event registration. On the other hand, in a case where an event transmission destination URL does not correspond to a transmission restriction target of the personal firewall, event registration based on the received registration request is performed, which makes it possible to realize processing for registering an event which can be transmitted. As a result, it is possible to eliminate such a problem that although the information processing apparatus 100 registers an event in the image forming apparatus 200, the information processing apparatus 100 continues to wait for the event which cannot be transmitted due to the personal firewall function of the image forming apparatus 200.

Further, even when the transmission restriction function of the personal firewall is set enabled, if an event transmission destination URL corresponds to a permission target, it is determined that the event transmission destination URL does not correspond to a transmission restriction target. This makes it possible to enable transmission of an event to the event transmission destination URL on an individual destination basis even when the transmission restriction function is enabled. Further, in a case where event registration has failed, this fact is notified to the image forming apparatus 200, and hence it is possible to notify a user, such as the administrator, of the image forming apparatus 200 of the fact that event registration has failed.

A variation of the event registration process will be described with reference to FIGS. 7 and 8.

Figure 7:
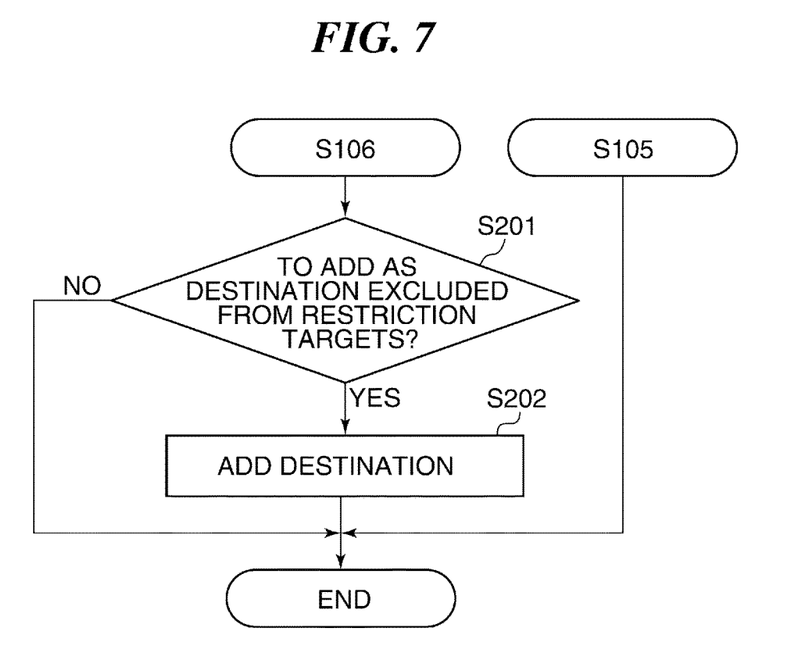
FIG. 7 is a flowchart of part of a variation of the event registration process.
Figure 8:
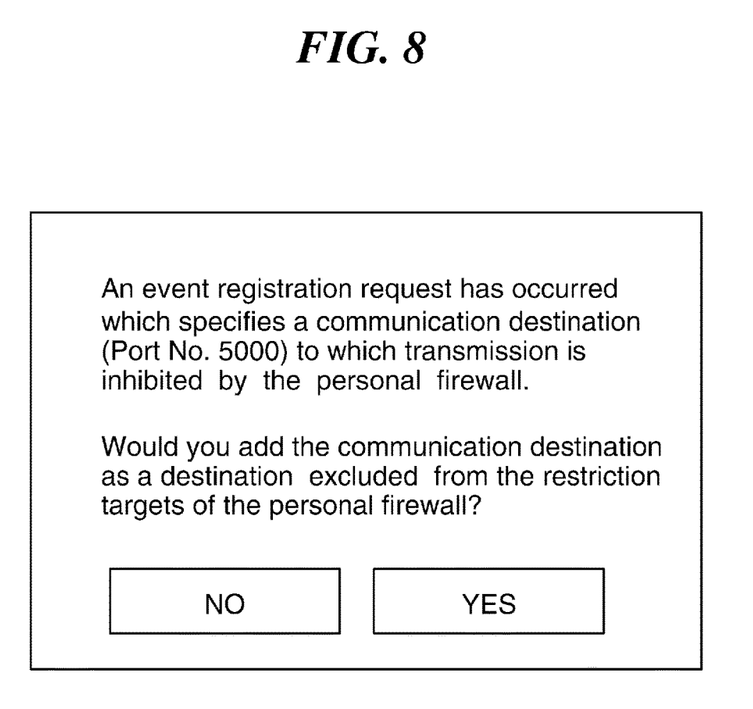
FIG. 8 is a diagram showing an example of a notification and confirmation screen.

FIG. 7 is a flowchart of part of a variation of the event registration process. The program for executing the variation of the event registration process is stored in the ROM 204 or the HDD 205, and is executed by the CPU 202 after being loaded into the RAM 203.

The variation of the event registration process in FIG. 7 differs from the event registration process in FIG. 5 in that steps S201 and S202 are added after the step S106. The steps S101 to S106 omitted in FIG. 7 are the same as those described with reference to FIG. 5. After execution of the step S106, the CPU 202 proceeds to the step S201. In the step S201, the CPU 202 displays a notification and confirmation screen shown in FIG. 8 on the console panel 211. This display includes not only information indicative of the cause of the event registration failure, but also a display for prompting a user to confirm whether or not to additionally register the event transmission destination URL which could not be registered this time as a destination excluded from the transmission restriction targets of the personal firewall. The CPU 202 determines, via a notification confirmation screen, that the event transmission destination URL is to be added as a destination excluded from the transmission restriction targets of the personal firewall. When the user presses "YES" on the notification and confirmation screen, the event transmission destination URL can be added to the destinations excluded from the transmission restriction targets of the personal firewall.

If it is determined in the step S201 that an instruction for adding the event transmission destination URL to the destinations excluded from the transmission restriction targets of the personal firewall has been input, in the step S202, the CPU 202 excludes the event transmission destination URL from the transmission restriction targets. More specifically, the CPU 202 causes the policy management section 1003 to add the port number of the event transmission destination URL to the permission conditions shown in FIG. 4. As a result, the event transmission destination URL is set to a destination corresponding to a permission target. After that, the event registration process described with reference to FIG. 7 is terminated. Note that after execution of the step S202, the process may be returned to the step S101. This makes it possible to register the event transmission destination URL which has failed in registration this time by making an attempt to perform event registration again. If it is determined in the step S201 that an instruction for adding the event transmission destination URL to the destinations excluded from the transmission restriction targets of the personal firewall has not been input, the event registration process described with reference to FIG. 7 is immediately terminated.

Note that in the step S105 in FIG. 5, the success in event registration may be notified to the user on the image forming apparatus 200. Further, it is not necessarily required to configure the policy management section 1003 such that it is capable of setting the enabling/disabling of the function of the persona firewall 1002, but the function of the persona firewall 1002 may be always enabled.

Note that in application of the present invention, the type of the image forming apparatus 200 as the network device is not particularly limited, and further, the network device is not limited to an apparatus including the image forming function.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-111698 filed Jun. 3, 2016, which is hereby incorporated by reference herein in its entirety.

What is claimed is:

1. A network device that has a personal firewall function, and registers an event concerning a network service, comprising:
   one or more processors, connected to a memory, the one or more processors being configured to:
   receive a registration request for registering an event;
   determine whether or not a transmission destination specified by the received registration request corresponds to a transmission restriction target of the personal firewall; and
   perform control, when it is determined that the transmission destination corresponds to the transmission restriction target, so as not to register an event according to the registration request,
   wherein when control is performed so as not to register an event according to the registration request, a response indicative of a registration failure is transmitted to a transmission source of the registration request.

2. The network device according to claim 1, wherein when it is determined that the transmission destination does not correspond to the transmission restriction target, control is performed so as to register an event according to the registration request.

3. The network device according to claim 1, the one or more processors being configured to: set enabling/disabling of a transmission restriction function of the personal firewall, and set a permission target to which transmission is permitted by the personal firewall, and wherein in a case where the transmission restriction function is set enabled, and also the transmission destination does not correspond to the permission target, it is determined that the transmission destination corresponds to the transmission restriction target.

4. The network device according to claim 3, wherein in a case where the transmission restriction function is set disabled, or in a case where the transmission destination corresponds to the permission target even when the transmission restriction function is set enabled, it is determined that the transmission destination does not correspond to the transmission restriction target.

5. The network device according to claim 3, wherein in a case where control is performed so as not to register an event according to the registration request, on condition that a user provides an instruction for setting the transmission destination to the permission target, the transmission destination is set to a destination corresponding to the permission target.

6. The network device according to claim 1, the one or more processors being configured to: provide a notification indicative of a registration failure in a case where control is performed so as not to register an event according to the registration request.

7. The network device according to claim 1, wherein the network device is an image forming apparatus having an image forming function.

8. A method of controlling a network device that has a personal firewall function, and registers an event concerning a network service, comprising:
   receiving a registration request for registering an event;
   determining whether or not a transmission destination specified by the registration request received by said receiving corresponds to a transmission restriction target of the personal firewall; and
   performing control, when it is determined by said determining that the transmission destination corresponds to the transmission restriction target, so as not to register an event according to the registration request,
   wherein when control is performed so as not to register an event according to the registration request, a response indicative of a registration failure is transmitted to a transmission source of the registration request.

9. A non-transitory computer-readable storage medium storing a computer-executable program for executing a method of controlling a network device that has a personal firewall function, and registers an event concerning a network service,
   wherein the method comprises:
   receiving a registration request for registering an event;
   determining whether or not a transmission destination specified by the registration request received by said receiving corresponds to a transmission restriction target of the personal firewall; and
   performing control, when it is determined by said determining that the transmission destination corresponds to the transmission restriction target, so as not to register an event according to the registration request,
   wherein when control is performed so as not to register an event according to the registration request, a response indicative of a registration failure is transmitted to a transmission source of the registration request.

* * * * *